US008635691B2

(12) United States Patent
Vogel et al.

(10) Patent No.: US 8,635,691 B2
(45) Date of Patent: Jan. 21, 2014

(54) SENSITIVE DATA SCANNER

(75) Inventors: D J Vogel, Brookfield, WI (US); Benjamin Yu, Irvine, CA (US); John Paul Moon, Los Angeles, CA (US)

(73) Assignee: 403 Labs, LLC, Chicago, IL (US)

( * ) Notice: Subject to any disclaimer, the term of this patent is extended or adjusted under 35 U.S.C. 154(b) by 875 days.

(21) Appl. No.: 12/041,363

(22) Filed: Mar. 3, 2008

(65) Prior Publication Data

US 2008/0216174 A1 Sep. 4, 2008

Related U.S. Application Data

(60) Provisional application No. 60/904,529, filed on Mar. 2, 2007.

(51) Int. Cl.
*G06F 11/00* (2006.01)
(52) U.S. Cl.
USPC ............................................................ 726/22
(58) Field of Classification Search
USPC ..................................... 726/22; 713/186, 200
See application file for complete search history.

(56) References Cited

U.S. PATENT DOCUMENTS

| 3,457,391 | A | * | 7/1969 | Yamamoto | 235/381 |
|---|---|---|---|---|---|
| 5,832,208 | A | * | 11/1998 | Chen et al. | 726/24 |
| 5,960,170 | A | * | 9/1999 | Chen et al. | 714/38 |
| 6,725,444 | B2 | | 4/2004 | Fergus | |
| 6,839,707 | B2 | | 1/2005 | Lee et al. | |
| 6,842,861 | B1 | * | 1/2005 | Cox et al. | 713/188 |
| 7,103,606 | B2 | | 9/2006 | Brown et al. | |
| 7,107,618 | B1 | * | 9/2006 | Gordon et al. | 726/24 |
| 2003/0115479 | A1 | * | 6/2003 | Edwards et al. | 713/200 |
| 2004/0225645 | A1 | | 11/2004 | Rowney et al. | |
| 2005/0071432 | A1 | * | 3/2005 | Royston, III | 709/206 |
| 2006/0174123 | A1 | | 8/2006 | Hackett et al. | |
| 2006/0253905 | A1 | | 11/2006 | Mansel | |
| 2006/0282408 | A1 | | 12/2006 | Wisely et al. | |
| 2007/0011463 | A1 | * | 1/2007 | Garfinkle | 713/186 |
| 2007/0169191 | A1 | * | 7/2007 | Greene et al. | 726/22 |
| 2007/0220137 | A1 | * | 9/2007 | Chess et al. | 709/224 |

FOREIGN PATENT DOCUMENTS

| GB | 2408368 | | 5/2005 |
|---|---|---|---|
| WO | WO 0124045 A2 | * | 4/2001 |
| WO | WO 0124046 A2 | * | 4/2001 |

* cited by examiner

*Primary Examiner* — Hadi Armouche
*Assistant Examiner* — Dao Ho
(74) *Attorney, Agent, or Firm* — McDonnell, Boehnen, Hulbert & Berghoff LLP (57) ABSTRACT

A method and system of scanning a client for sensitive data. A server may receive, from the client, a request to scan the data stored in the data storage of the client for sensitive data. In response to receiving the request, the server may provide the client with a scanner, which causes the client to carry out functions including: (a) scanning the data stored in data storage to identify sensitive data; (b) collecting data based on the identified sensitive data; and (c) reporting the collected data. The server may then receive the collected data from the client and responsively analyze the data. The server may also provide feedback about the identified sensitive data to the client or another server.

22 Claims, 2 Drawing Sheets

SENSITIVE DATA SCANNER

PRIORITY OF THE INVENTION

This application claims priority to U.S. Provisional Application Ser. No. 60/904,529 filed Mar. 2, 2007, incorporated by reference herein in its entirety.

FIELD OF THE INVENTION

The present invention relates generally to computer scanning software, and more particularly to scanner software for sensitive data stored on a computer.

BACKGROUND

In today's computing environment, various components of a system (e.g., hardware and/or software) may handle sensitive data for authentication and/or other purposes. In this respect, the system components may store the sensitive data either temporarily or for some period of time. For example, a system component may handle and/or store a variety of sensitive data that indicates sensitive information, such as personal identification information, financial information, and/or other sensitive information for authentication and/or other purposes. However, the storage of sensitive data for any period of time may not be desirable. Further, the storage of sensitive data may even be prohibited by one or more regulations. For example, the Payment Card Industry (PCI) Data Security Standard (DSS) regulates the storage of PCI data, and the DSS includes requirements for protecting cardholder data that limit and/or prohibit the storage of PCI data (e.g., magnetic strip data, verifications codes, etc). See PCI DSS Version 1.1, found at https://www.pcisecuritystandards.org/tech/download_the_pci_dss.htm.

In some cases, a user and/or owner of the system component may not even be aware that the system component is storing sensitive information. For example, a business using a payment card reader may not be aware that payment card data is being stored on the business's local system. As such, it would be desirable to have a scanner that functions to scan system components for sensitive data. Further, it would be desirable to have a scanner that performs various functions in response to identifying sensitive data on a system component, such as alerting the user and/or owner of the system component or modifying the sensitive data.

SUMMARY

In a first aspect, the present invention may take the form of a method of scanning a client for sensitive data, where the client may include a processor, data storage, and data stored in the data storage. The method may include (a) receiving, from the client, a request to scan the data stored in the data storage of the client for sensitive data, (b) in response to receiving the request, providing the client with a scanner that causes the client to carry out functions including (1) scanning the data stored in data storage to identify sensitive data, (2) collecting data based on the identified sensitive data, and (3) reporting the collected data, (c) receiving the collected data from the client, and (d) analyzing the collected data. The method will preferably be carried out by a server.

In one embodiment, the scanner may be program instructions executable by the processor of the client. In another embodiment, providing the client with the scanner may include sending the scanner to the client via a network. In another embodiment, the method may further include sending the client an instruction to invoke the scanner, where the client invokes the scanner in response to receiving the instruction.

In another embodiment, the sensitive data may include financial data and personal identification data. In this respect, in another embodiment, the financial data may include one or more of Primary Account Number (PAN) data, magnetic stripe data, verification data, and bank account data.

In another embodiment, the function of the client scanning the data stored in data storage to identify sensitive data may include the client searching the data stored in data storage for recognizable patterns that indicate sensitive data.

In another embodiment, the function of reporting the collected data may include sending the collected data from the client to a server via a network. In another embodiment, the collected data may include a modified version of the identified sensitive data. In another embodiment, the collected data may include an indication of a location in the data storage of the identified sensitive data. In another embodiment, the data stored in data storage may include one or more data files containing the identified sensitive data, in which case the collected data may include metadata and/or a file signature for the one or more data files containing the identified sensitive data.

In another embodiment, the scanner may further cause the client to carry out a function of modifying the identified sensitive data.

In another embodiment, the function of analyzing the collected data based on the identified sensitive data may include validating the identified sensitive data. In this respect, the method may also include maintaining predefined data indicating false positives for sensitive data, in which case validating the identified sensitive data may include comparing the collected data to the predefined data. In another embodiment, the predefined data indicating the false positives for sensitive data may include one or more of predefined data elements, predefined metadata, and predefined file signatures that indicate false positives.

In another embodiment, the method may include providing feedback about the identified sensitive data stored in the data storage of the client to the client. In this respect, in another embodiment, the feedback about the identified sensitive data may include one or both of an indication of a location in the data storage of the identified sensitive data and an analysis of the identified sensitive data.

In another embodiment, providing the client with the scanner may include providing a user of the client with an interface for interacting with the scanner.

In another aspect, the present invention may take the form of a method of scanning a client for sensitive data, where the client comprises a processor, data storage, and data stored in the data storage. The method may include (a) requesting, from a server, a scan for sensitive data stored in the data storage, (b) receiving a scanner from the server, (c) invoking the scanner, which causes the functions to be carried out including (1) scanning the data stored in data storage to identify sensitive data, (2) collecting data based on the identified sensitive data, (3) reporting the collected data to the server, and (d) receiving from the server feedback about the sensitive data stored in the data storage. The method will preferably be carried out by the client.

In one embodiment, the method may further include storing the scanner in the data storage of the client in response to receiving the scanner. In this respect, in another embodiment, storing the scanner in the data storage of the client may include temporarily storing the scanner into volatile data storage, in which case invoking the scanner may include executing the scanner stored in the volatile data storage via the processor. In another embodiment, storing the scanner in the data storage of the client may include storing the scanner into non-volatile data storage, in which case invoking the scanner may include (1) loading the scanner into volatile data storage, and (2) executing the loaded scanner via the processor.

In another embodiment, scanning the data stored in data storage to identify sensitive data may include searching the data stored in data storage for recognizable patterns that indicate sensitive data. In another embodiment, the feedback about the identified sensitive data may include one or both of an indication of a location in the data storage of the identified sensitive data and an analysis of the identified sensitive data.

In another aspect, the present invention may take the form of a method of scanning a client for sensitive data, where the client may include a processor, data storage, and data stored in the data storage. The method may include (a) receiving a request to scan the data stored in the data storage of the client for sensitive data, (b) in response to receiving the request, scanning the data stored in data storage to identify sensitive data, (c) collecting data based on the identified sensitive data, (d) analyzing the collected data, and (e) providing feedback about the identified sensitive data to a user of the client station.

These as well as other aspects and advantages will become apparent to those of ordinary skill in the art by reading the following detailed description, with reference where appropriate to the accompanying drawings. Further, it should be understood that the embodiments described in this summary and elsewhere are intended to be examples only and do not necessarily limit the scope of the invention.

DETAILED DESCRIPTION

Unless clearly indicated by the context, different embodiments of the invention can be used together.

In a first aspect, the present invention may take the form of a method of scanning a client for sensitive data, where the client may include a processor, data storage, and data stored in the data storage. The method may include (a) receiving, from the client, a request to scan the data stored in the data storage of the client for sensitive data, (b) in response to receiving the request, providing the client with a scanner that causes the client to carry out functions including (1) scanning the data stored in data storage to identify sensitive data, (2) collecting data based on the identified sensitive data, and (3) reporting the collected data, (c) receiving the collected data from the client, and (d) analyzing the collected data. The method will preferably be carried out by a server.

As user herein, a processor is a hardware component of a computing device that controls and/or performs the execution and/or interpretation of program instructions. During execution and/or interpretation of program instructions, the processor may carry out other functions, such as performing arithmetic and logical operations on data and controlling input/output functionality of the computing device. The processors described herein may include one or more general purpose microprocessors (e.g., a central processing unit (CPU)) and/or dedicated signal processors. Other examples are possible as well.

As used herein, data is digital representation of information, and may take the form of a sequence of alphanumeric characters and/or binary digits for instance. Data may be organized into various forms, including data elements, data instances, and/or data files. As used herein, a data element is a basic unit of data that represents an individual piece of information. As used herein, a data instance is a group of related data elements, such as a line of related data elements in a database. As used herein, a data file is a grouping of data elements and/or instances into a common unit of data. In one example, the data files described herein may take the form of binary files, which as used herein are data files encoded in binary form. The data files described herein may include both data content and metadata. As used herein, metadata is special data that describes a data file and/or the data content therein, and may include an identifier of the data file (e.g., name of the binary file), a type of the data file (e.g., program file, text file, etc.), a location of the data file in data storage (e.g., a file path), and/or a size of the data file for instance.

As used herein, data storage refers to one or more internal and/or external hardware components of a computing device for storing data. The data storage may be independent of the processor in the computing device, or the data storage integrated in whole or in part with the processor. Further, the data storage may include both volatile data storage components (components that require power to maintain stored data and are typically more quickly accessible by the processor) and non-volatile data storage components (components that do not require power to maintain stored data and are typically less quickly accessible by the processor). Volatile data storage may include random access memory (RAM), registers, and/or cache for instance. Non-volatile data storage may include read only memory (ROM), a hard disk drive, a solid state drive, flash memory, optical storage devices (e.g. CD or DVD drives), and/or floppy disks for instance. Other examples are possible as well. As used herein, a software program stored in non-volatile data storage may be referred to as an installed software program.

The data stored in data storage described herein may be either active data or deleted data. As used herein, active data is data stored in data storage that is readily accessible by software programs being executed by the processor. As used herein, deleted data is data stored in data storage that was previously active data but has since been rendered inaccessible to software programs being executed processor, typically as a result of an instruction to delete the data. The portion of the data storage in which deleted data is located may be referred as slack space. The deleted data described herein may remain in the data storage in whole or in part until it is overwritten with active data or permanently "wiped" from data storage with a software program specifically designed to remove deleted data. Further, the deleted data remaining in the data storage may also be recovered and/or restored as active data with a software program specifically designed to recover and/or restore the deleted data.

As user herein, sensitive data is data that represents sensitive information, which as used herein is information that should be protected because unauthorized disclosure of and/or access to the information could adversely affect someone or something. Often times, the sensitive information is non-public and only exchanged between two parties that are intentionally establishing and/or engaging in a trusting relationship. As examples, the sensitive data described herein may include financial data and personal identification data. Financial data may include payment card data such as Primary Account Number (PAN) data, cardholder name data, expiration date data, magnetic stripe data (e.g., track 1 data, track 2 data, etc.), and/or verification data (e.g., Personal Identification Number (PIN), card variation code, etc.). Additionally, financial data may include bank account data such as routing number and/or account number data. Personal identification data may include social security number (SSN) data or tax identification number (TIN) data. Other examples of sensitive data may exist as well.

In one embodiment, the scanner may be program instructions executable by the processor of the client. In this respect, the scanner may be considered a software program, which as used herein is a list of program instructions that are executable or interpretable by a processor to cause a computing device to perform various tasks. Software programs may also contain one or more data elements for use during execution or interpretation of the program instructions. The software programs described herein may take various forms, including object code, machine language code, bytecode, and/or source code for instance, and may be contained within one or more data files. Further, the software programs described herein may be of various types, including system software programs that manage and control the device hardware such that the device can function (e.g., operating system software programs) and/or application software programs that enable the use of a device for specific tasks (e.g., business software programs).

In another embodiment, providing the client with the scanner may include sending the scanner to the client via a network. In another embodiment, the method may further include sending the client an instruction to invoke the scanner, where the client invokes the scanner in response to receiving the instruction. As used herein, invoking a software program, such as the scanner, refers to a function of initiating the execution or interpretation of the instructions of the software program. In this respect, if the software program is an installed software program, invoking the installed software program may include loading the installed software program into volatile data storage and then initiating the execution or interpretation of the loaded software program. As used herein, loading a software program into volatile data storage refers to copying and/or moving the software program from non-volatile data storage to volatile data storage.

In another embodiment, the function of the client scanning the data stored in data storage to identify sensitive data may include the client searching the data stored in data storage for recognizable patterns that indicate sensitive data. As used herein, a recognizable pattern is a predefined sequence and/or pattern of literal characters and/or wildcard characters that define a generalization of a data element and/or instance, and may include as one example a regular expression. As used herein, a literal character is a single character that represents itself, and may include alphanumeric characters and/or punctuation characters for instance. As used herein, a wildcard character is a single character that represents zero, one, or more characters, and may include a character that represents any character, a character that represents a particular type of characters (e.g., all numeric characters, all upper case characters, etc.), and/or a character that represents a predefined group of different characters for instance. In one example, the predefined sequence and/or pattern may be specified using logical operators (e.g., AND, OR, NOT, XOR, etc.) and/or control characters, which as used herein are characters that specify how to interpret a sequence of alphanumeric and/or wildcard characters.

In another embodiment, the function of reporting the collected data may include sending the collected data from the client to a server via a network. In another embodiment, the collected data may include a modified version of the identified sensitive data. As used herein, a modified version of data is a version of the data that is changed such that it still indicates the data without disclosing the data in full, and includes a version of the data that has been masked, redacted, truncated, and/or encrypted.

In another embodiment, the collected data may include an indication of a location in the data storage of the identified sensitive data. In another embodiment, the data stored in data storage may include one or more data files containing the identified sensitive data, in which case the collected data may include metadata and/or a file signature for the one or more data files containing the identified sensitive data. As used herein, a file signature is an identifier of the data file that is generated based on the contents and/or certain metadata of the data file, and includes as examples a checksum and/or a hash. Typically, a file signature remains unchanged while other metadata variables are changed.

In another embodiment, the scanner may further cause the client to carry out a function of modifying the identified sensitive data. As used herein, modifying data may include overwriting the data in data storage and/or deleting the data from data storage.

In another embodiment, the function of analyzing the collected data based on the identified sensitive data may include validating the identified sensitive data. In this respect, the method may also include maintaining predefined data indicating false positives for sensitive data, in which case validating the identified sensitive data may include comparing the collected data to the predefined data. As used herein, a false positive is a data element that has been incorrectly identified as sensitive data. In another embodiment, the predefined data indicating the false positives for sensitive data may include one or more of predefined data elements, predefined metadata, and predefined file signatures that indicate false positives.

In another embodiment, the method may include providing feedback about the identified sensitive data stored in the data storage of the client to the client. In this respect, in another embodiment, the feedback about the identified sensitive data may include one or both of an indication of a location in the data storage of the identified sensitive data and an analysis of the identified sensitive data.

In another embodiment, providing the client with the scanner may include providing a user of the client with an interface for interacting with the scanner. As used herein, an interface is a software program that causes a computing device to receive input from a user of the client and/or present output to the user related to the scanner.

In another aspect, the present invention may take the form of a method of scanning a client for sensitive data, where the client comprises a processor, data storage, and data stored in the data storage. The method may include (a) requesting, from a server, a scan for sensitive data stored in the data storage, (b) receiving a scanner from the server, (c) invoking the scanner, which causes the functions to be carried out including (1) scanning the data stored in data storage to identify sensitive data, (2) collecting data based on the identified sensitive data, (3) reporting the collected data to the server, and (d) receiving from the server feedback about the sensitive data stored in the data storage. The method will preferably be carried out by the client.

In one embodiment, the method may further include storing the scanner in the data storage of the client in response to receiving the scanner. In this respect, in another embodiment, storing the scanner in the data storage of the client may include temporarily storing the scanner into volatile data storage, in which case invoking the scanner may include executing the scanner stored in the volatile data storage via the processor. In another embodiment, storing the scanner in the data storage of the client may include storing the scanner into non-volatile data storage, in which case invoking the scanner may include (1) loading the scanner into volatile data storage, and (2) executing the loaded scanner via the processor.

In another embodiment, scanning the data stored in data storage to identify sensitive data may include searching the data stored in data storage for recognizable patterns that indicate sensitive data. In another embodiment, the feedback about the identified sensitive data may include one or both of an indication of a location in the data storage of the identified sensitive data and an analysis of the identified sensitive data.

In another aspect, the present invention may take the form of a method of scanning a client for sensitive data, where the client may include a processor, data storage, and data stored in the data storage. The method may include (a) receiving a request to scan the data stored in the data storage of the client for sensitive data, (b) in response to receiving the request, scanning the data stored in data storage to identify sensitive data, (c) collecting data based on the identified sensitive data, (d) analyzing the collected data, and (e) providing feedback about the identified sensitive data to a user of the client station.

Figure 1:
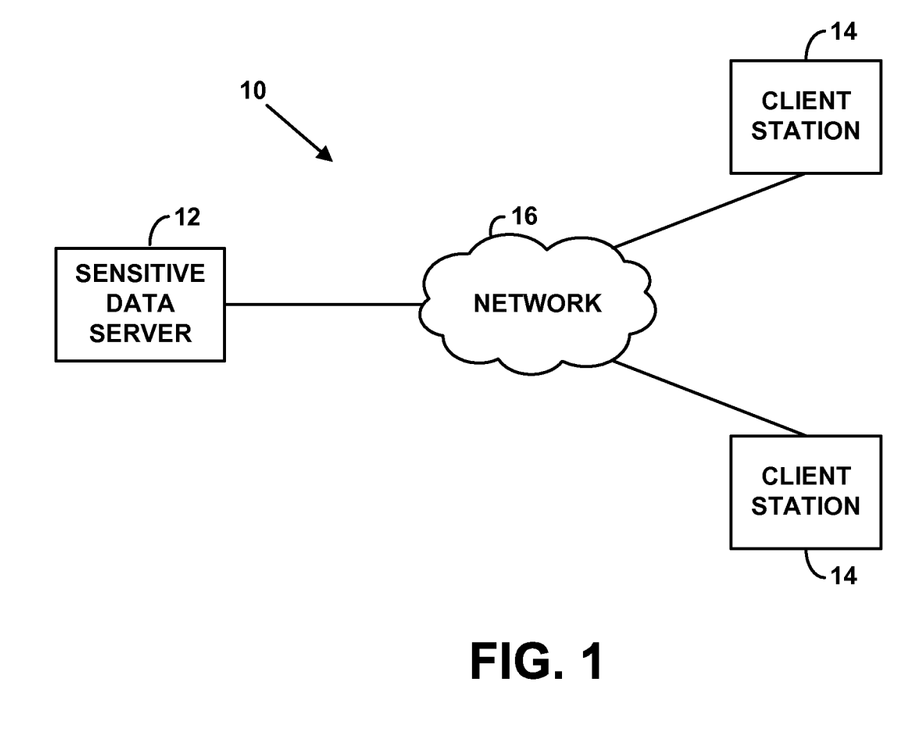
FIG. 1 is a simplified block diagram of a communications system, according to an example of the present invention.

Referring to the drawings, FIG. 1 is a simplified block diagram of a communications system 10, according to an example of the present invention. As shown, the system 10 includes a sensitive data server 12 communicatively coupled to a plurality of client stations 14 via a network 16.

It should be understood, however, that this and other arrangements described herein are set forth for purposes of example only. As such, those skilled in the art will appreciate that other arrangements and other elements (e.g., machines, interfaces, functions, orders of functions, etc.) can be used instead, some elements may be added, and some elements may be omitted altogether. Further, as in most communications applications, those skilled in the art will appreciate that many of the elements described herein are functional entities that may be implemented as discrete or distributed components or in conjunction with other components, and in any suitable combination and location. Still further, various functions described herein as being performed by one or more entities may be carried out by hardware, firmware and/or software logic. For instance, various functions may be carried out by a processor executing a set of machine language instructions stored in memory.

The sensitive data server 12 may be any communication device with a processor and access to data storage (e.g., internal or external data storage). The sensitive data server 12 will also preferably include a one or more software programs and various forms of data stored in the data storage. In a preferred example, the sensitive data server 12 may be literally a "server" class computer. In another example, the sensitive data server 12 be a client station (e.g., a personal computer) or some other computing device that functions as a sensitive data server 12.

Each of the client stations 14 may be any communication device with a processor, access to data storage (e.g., internal or external) that stores data, which may include sensitive data. Additionally, each of the client stations 14 may include one or more software programs stored in data storage. Additionally yet, each of the client stations 14 may include a user interface through which a user interacts with the client station 14. The user interface may include input components (e.g., a keyboard, a microphone, a scanner, and/or a payment card reader) and output components (e.g., a display screen and/or a speaker). As examples, each of the client stations 14 may be, without limitation, a personal computer, a server computer, a handheld personal computer, a personal digital assistance (PDA), a smartphone, a point of sale (POS) device (e.g., a payment card reader), and/or a network device (e.g., gateway, router, switch, wireless access point, etc.) for instance.

The network 16 may function to communicatively couple the sensitive data server 12 to the client stations 14. As such, the network 16 may include, for example, one or more packet-switched networks (e.g., the Internet), circuit-switched networks (e.g., public switched telephone network (PSTN)), radio access networks (RANs) (e.g., a cellular network), and/or signaling networks (e.g., a Signaling System #7 (SS7) network). In a preferred example, the network 16 will include at least a packet-switched network that facilitates packet-based communication between the sensitive data server 12 and the client stations 14. The packet-switched network 16 may include some combination of personal area networks, local area networks (LANs), metropolitan area networks (MANs), and/or wide area networks (WANs), and will preferably include the Internet. The packet-switched network 16 may route packets based on an Internet Protocol (IP) protocol in combination with the Transmission Control Protocol (TCP) and the Hypertext Transfer Protocol (HTTP). Many other examples of network configurations and transmission protocols are possible as well.

Figure 2:
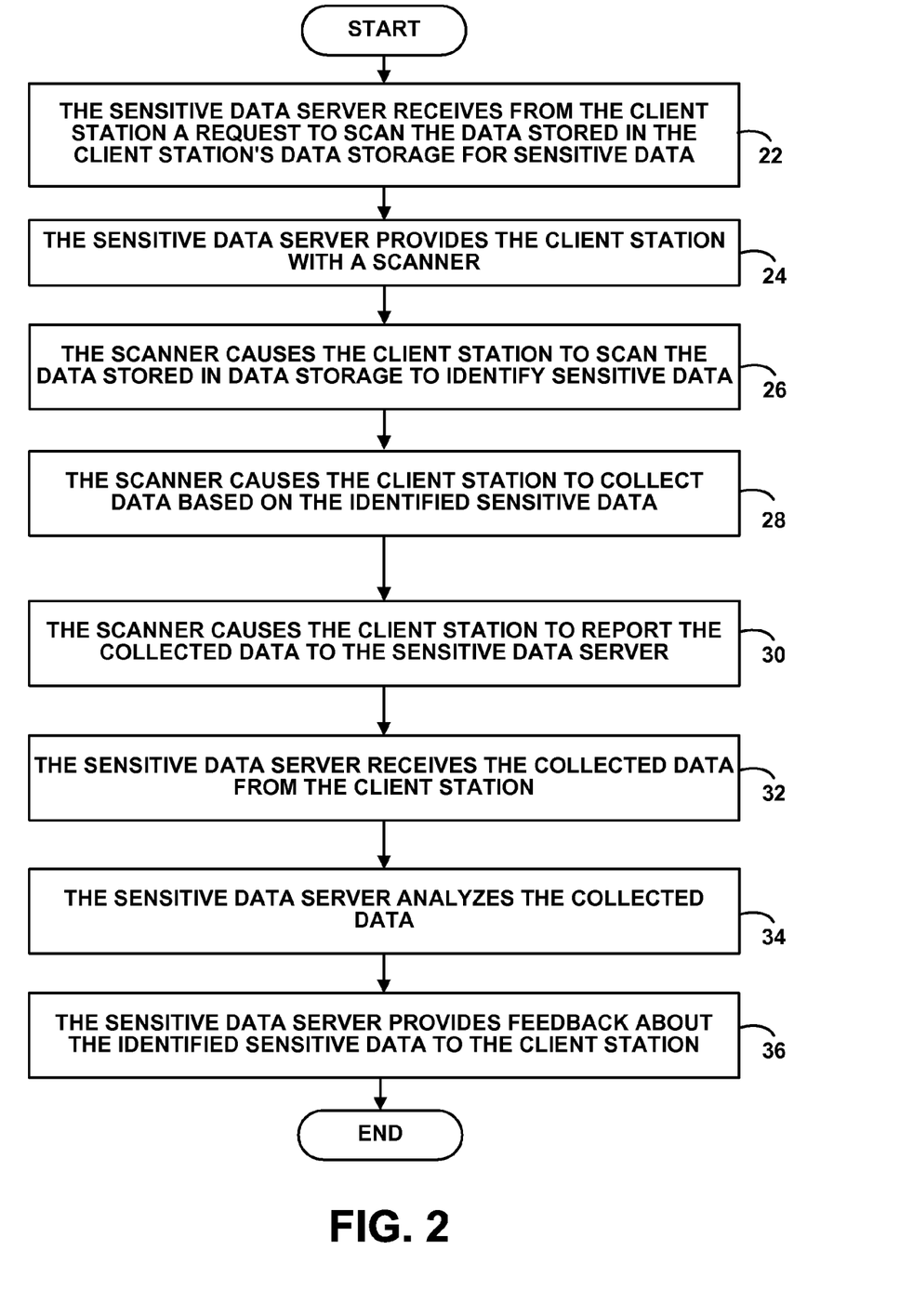
FIG. 2 is a flow chart depicting a method of scanning a client station for sensitive data, according to an example of the present invention.

FIG. 2 is a flow chart depicting a method of scanning a client station 14 for sensitive data, according to an example of the present invention. The method may begin at step 22 when the sensitive data server 12 receives a request from the client station 14 to scan the data stored in data storage of the client station 14 for sensitive data. In one example, the request may take the form of an HTTP request, which the client station 14 sends in response to a user's directive (e.g., selecting a hyperlink or menu item, entering a Uniform Resource Locator (URL), invoking an application software program, etc.). In this respect, the user may provide the directive, and thus initiate the request, while accessing a website hosted by the sensitive data server 12 (or some other server associated with the sensitive data server 12).

In one respect, the request from the client station 14 to the sensitive data server 12 may generally request a sensitive data scan, without providing additional details. In another respect, the request from the client station 14 to the sensitive data server 12 may specify various parameters and/or preferences for the sensitive data scan, which the user may input prior to invoking the request. For example, the request may specify whether the client station 14 wants a one-time scan or a more frequent scan. As another example, the request may specify the frequency of the scan. As yet another example, the request may specify particular data to be scanned. As a further example, the request may specify particular modifications to sensitive data identified in data storage (e.g., delete sensitive data, mask sensitive data, etc.)

At step 24, in response to receiving the request, the sensitive data server 12 may provide the client station 14 with a scanner that causes the client station 14 to (a) scan the data stored in data storage to identify sensitive data, (b) collect data based on the identified sensitive data, and (c) report the collected data. The scanner may cause the client station 14 to carry out other operations as well, as described in more detail below. The scanner itself will preferably be a software program, and as such may take the form of one or more binary files that contain object code, machine language code, bytecode, and/or source code for instance. In one example, the scanner may be provided from the sensitive data server 12 to the client station 14 in its entirety during a single transaction. As another example, the scanner may be provided from the sensitive data server 12 to the client station 14 in portions (e.g., groups of instructions and data) over multiple transactions. In this respect, some portions of the scanner may be optional, and as such the sensitive data server 12 may only provide these portions in response to a communication from the client station 14.

In one example, the scanner may be an on-demand software program (e.g., an applet) that the sensitive data server 12 provides to the client station 14 for temporary use. In this respect, the sensitive data server 12 may send the on-demand scanner to the client station 14 via the network 16, and the client station 14 may store the on-demand scanner directly into volatile data storage (e.g., RAM, cache, etc.). Once the on-demand scanner is stored in the volatile data storage, the processor of the client station 14 may invoke the on-demand scanner by executing and/or interpreting the scanner stored in volatile data storage without any further processing, such that the functions described herein are performed by the client station 14. In this respect, the client station 14 will preferably invoke the on-demand scanner automatically once the client station 14 stores the scanner into volatile data storage. Alternatively, however, the client station 14 may invoke the on-demand scanner in response to some triggering event, such as the client station 14 receiving a directive from the sensitive data server 12 via the network 16 and/or a user of the client station 14. After termination of the on-demand scanner, the on-demand scanner may then be removed from the data storage of the client station 14 (e.g., it may be overwritten by new data in the volatile data storage or cleared from volatile data storage when the client station 14 is powered off).

In another example, the scanner may be an application software program that the sensitive data server 12 provides to the client station 14 for persistent use. In this respect, the sensitive data server 12 may send the scanner to the client station 14 via the network 16, and the client station 14 may then install the scanner by storing it into non-volatile data storage. (It should be understood, however, that the sensitive data server 12 may provide the scanner to the client station 14 independently of the network 16, such as by causing a storage medium containing the scanner to be sent to a user of the client station 14). Thereafter, the client station 14 may invoke the installed scanner at any time. For example, the client station 14 may invoke the installed scanner automatically once the client station 14 stores the scanner into data storage. As another example, the client station 14 may invoke the installed scanner in response to an instruction from the sensitive data server 12, which the sensitive data server 12 may send to the client station 14 either periodically (e.g., according to a schedule) or in response to some triggering event (e.g., a request from a user). Other examples are possible as well.

When the client station 14 invokes the installed scanner, the client station's processor may load the installed scanner into volatile data storage and then execute and/or interpret the loaded scanner, such that the functions described above are performed by the client station 14. After termination of the installed scanner, the scanner loaded in volatile data storage may be removed, but the installed scanner may continue to remain on the client station 14 in non-volatile data storage for future use. In this respect, the client station 14 may invoke the installed scanner again at one or more other times. For example, the client station 14 may invoke the installed scanner at a later time in response to receiving a direction from the sensitive data server 12 via the network 16, which sensitive data server 12 may send based on a user request, a schedule, and/or some other triggering event. Other examples are possible as well.

In addition to providing the client station 14 with the scanner, the sensitive data server 12 may also provide a user of the client station 14 with an interface for interacting with the scanner and/or the sensitive data server 12. Similar to the scanner, the interface will preferably be a software program, and as such may take the form of a binary file that contains object code, machine language code, bytecode, and/or source code for instance. In this respect, the interface may be either incorporated with the scanner or provided separately from the scanner.

In one example, the interface may be an on-demand software program received from the sensitive data server 12 via the network 16, such as an applet that executes within a web browser of the client station 14. As another example, the interface may be an application software program that may be stored and invoked on the client station 14. In either example, while executing the interface, most input that the client station 14 receives from the user will preferably be sent to sensitive data scanner 12 and most output that the client station 14 presents to the user will preferably originate from the sensitive data server 12, such that the user's interaction with the scanner occurs almost entirely via the network 16 and the sensitive data scanner 12. However, while executing the interface, the client station 14 may also facilitate some local interaction between the scanner and the user, such as by locally handling user requests related to the scanner (e.g., requests to pause a scan) and/or providing the user with output generated at the client station 14 related to the scanner (e.g., feedback on the progress of the scan).

The interface may cause the sensitive data server 12 and/or the client station 14 to perform various tasks related to the sensitive data scanner. For example, the interface may cause the sensitive data server 12 and/or the client station 14 to authenticate the user, such as by requesting the user to input authentication data (e.g., userID, password), receiving the authentication data, and verifying the authentication data. As another example, the interface may cause the sensitive data server 12 and/or the client station 14 to present the user of the client station 14 with management options for the sensitive data scanner (e.g., scan requests, scan schedules, scan types, scan commands, feedback request, etc.). In turn, the interface may cause the sensitive data server 12 and/or the client station 14 to receive (and optionally store) the user's management input and respond accordingly. For example, without limitation, the interface may cause the sensitive data server 12 and/or the client station 14 to (1) present the user with feedback about the sensitive data on the client station 14, (2) present the user with feedback about the configuration of the scanner (e.g., scan schedules), (3) invoke the scanner on the client station 14, (4) pause and/or stop the operation of the scanner on the client station 14, and/or (4) modify (e.g., mask or delete) sensitive data stored in the client station's data storage.

At step 26, during the execution or interpretation of the scanner, the scanner may first cause the client station 14 to scan the data stored in data storage to identify sensitive data. In this respect, when the client station's data storage is organized into one or more data files, the client station's processor may scan the one or more data files to identify sensitive data within those data files. The client station's processor may begin the scanning process by selecting a given data file from the client station's one or more data files stored in data storage. In one example, the client station's processor may select the given data file based on metadata of the given data file, such as a location of the given data file in data storage, an identifier of the given data file (e.g., a name of the given data file), a type of the given data file, a size of given the data file, and/or some other metadata. In another example, the client station's processor may select the given data file based on a file signature of the given data file, which the client station's processor may generate during the selection process. In yet another example, the client station's processor may select the given data file based on whether the given data file has previously been scanned. In still another example, the client station's processor may select the given data file based on a status of the given data file (e.g., active data file or deleted data file). Other examples are possible as well.

After selecting the given data file, the scanner may then cause the client station to process the given data file (i.e., access the given data file through methods either native to that file's normal function and/or methods that simulate elements of native function useful for processing purposes). In this respect, the client station's processor may begin processing the given data file by loading the given data file into volatile data storage, and the client station's processor may then operate on the loaded data file to carry out the functions described herein. Once the processing of the loaded data file is complete (i.e., all desired operations are performed), the client station's processor may remove the loaded data file from volatile data storage. Thereafter, the client station's processor may select a second given binary file, load the second given data file into volatile data storage, and then operate on the loaded second data file to carry out the functions described herein. The client station's processor may continue this process until it processes each data file stored in data storage, or some subset thereof. In this respect, the client station 14 may choose which data files to process during a given execution of the scanner based on file metadata, file signatures, file status (e.g., active or deleted), instructions from the sensitive data server 12, user instructions, and/or some other criteria.

While processing a given data file during scanning, the client station's processor may then search the given data file to identify sensitive data. In one example, the sensitive data may be financial data, such as payment card data and/or bank account data. The payment card data may include PAN data, cardholder name data, expiration date data, magnetic stripe data (e.g., track 1 data, track 2 data, etc.), and/or verification data (e.g., PIN, card verification value, etc.). The bank account data may include routing number and/or account number data. In another example, the sensitive data may be personal identification data, such as SSN data or TIN data. Other examples of sensitive data may exist as well.

The scanner may cause the client station 14 to search the data stored in data storage in a variety of manners. In a preferred example, the scanner will cause the client station 14 to search the data for recognizable patterns that indicate sensitive data. More particularly, for a given data file being processed, the client station's processor may search the contents and/or metadata of the given data file for one or more recognizable patterns that indicate sensitive data. The particular form of each recognizable pattern used in searching the data will preferably depend on the type of sensitive data that the pattern indicates. As one examples, a recognizable pattern for a payment card number may take the form of a sequence of characters that begins with a "4" and is then followed by 3 numeric characters, a first dash, 4 numeric characters, a second dash, 4 numeric characters, a third dash, and 4 number characters (i.e., 4???-????-????-????). Many other examples are possible as well. These recognizable patterns will preferably be included in the scanner, along with program instructions for matching data elements in the client station's data storage to the recognizable patterns. In one example, these program instructions may employ a Luhn algorithm during the matching process.

Advantageously, by using pattern recognition to search for sensitive data (e.g., as opposed to pre-selected literal data elements or file types), the scanner uses a more flexible means of identifying the sensitive data that does not require nearly as much predefined data to cause the client station 14 to perform an effective sensitive data scan. In turn, using pattern recognition may decrease the size, complexity, transfer time, installation time, and/or update frequency of the scanner. Further, by using pattern recognition to search for sensitive data, the scanner may enable the client station 14 to identify a wider range of sensitive data elements stored in the client station's data storage, and may even enable the client station 14 to identify sensitive data elements and/or sensitive data types that were not previously known.

At step 28, the scanner may cause the client station 14 to collect data based on the identified sensitive data. In a preferred example, the client station 14 will collect data based on the identified sensitive data as soon as the sensitive data is identified during the scanning (e.g., the client station 14 collects data based on a presently identified data element before scanning further data elements). As such, once the client station's processor identifies a sensitive data element in a given data file being processed (e.g., using pattern recognition as described above), the client station's processor may responsively generate and/or extract data based on that sensitive data element before continuing to search the given data file (or other data files) for additional sensitive data elements. In turn, the client station's processor may store the generated and/or extracted data in volatile data storage as collected data, and the client station's processor may also update the previously collected data stored in volatile data storage based on the generated and/or extracted data.

In one example, the collected data may include metadata for each given data file in which an element and/or instance of sensitive data is identified, such as an identifier of a given data file, a location in the data storage of a given data file, and/or a type of the given data file. In another example, the collected data may include file signature for each given data file in which an element and/or instance of sensitive data is identified, in which case the client station's processor may generate the file signature while processing the given data file and/or collecting the data. In yet another example, the collected data may include data about each element and/or instance of sensitive data identified on the client station 14, such as a location of each identified sensitive data element/instance (e.g., a location within a given data file such as a line number, a position in terms of bytes, a memory address, a cell indicator in a spreadsheet, etc.), a type of each identified sensitive data element/instance (e.g., PAN data, magnetic stripe data, SSN, etc.), and/or a version of each identified sensitive data element/instance itself, which may be modified (e.g., masked, redacted, truncated, encrypted, etc.). The collected data may include other data as well.

While collecting the data based on the identified sensitive data, the scanner may optionally cause the client station 14 to perform various functions based on the collected data. In this respect, it should be understood that these functions may occur while the client station 14 is in the process of scanning and collecting data for other stored data. As described above, the scanner may initially include program instructions and data for carrying out these optional functions, or the scanner may cause the client station 14 to request and receive program instructions and data for carrying out these optional functions from the sensitive data server 12 after execution of the scanner begins (e.g., in response to a user directive).

In one example, the scanner may optionally cause the client station 14 to format the collected data. In this respect, as noted above, this formatting may include modifying certain collected data, such as versions of identified sensitive data elements.

In another example, the scanner may optionally cause the client station 14 to analyze the collected data, such as by causing the client station 14 to validate the identified sensitive data. In this respect, the client station 14 may be able to identify false positives resulting from the scan. In one example, the client station 14 may validate the identified sensitive data by comparing the collected data to predefined data that indicates false positives for sensitive data. This predefined data may be included in the scanner, along with program instructions for performing the validation process.

In one respect, the predefined data may include one or more false positive data elements, which are data elements that often result in false positives (e.g., sequences of numbers that are often confused for PANs). In this respect, if the collected data includes a version of a sensitive data element identified on the client station 14, the client station 14 may compare the version of the sensitive data element to each maintained false positive data element to determine whether the identified sensitive data element is a false positive. In another respect, the predefined data may include one or more false positive metadata elements and/or file signatures, which are metadata elements and/or file signatures of data files that often contain false positives. The false positive metadata elements may include identifiers of the data files, locations of the data files, and/or types of the data files. In this respect, if the collected data includes metadata and/or file signatures of data files that the client station 14 identified as containing sensitive data, the client station 14 may compare the metadata and/or file signature of the identified data files to each maintained false positive metadata element and/or file signature, to determine whether the identified data file contains sensitive data elements that are false positives. Other examples for validating the indentified sensitive data may exist as well. In any case, once the client station 14 identifies a false positive, the client station 14 may then flag and/or remove the collected data associated with the false positive.

As another example, during the analysis process, the scanner may cause the client station 14 to calculate one or more indications of the quantity of sensitive data identified on the client station 14, including the quantity of sensitive data elements identified in each given data file and/or the data storage as a whole. For example, the client station's processor may calculate a number of instances of the same sensitive data (i.e., how many times a particular sensitive data element appears), a number of instances of different sensitive data (i.e., how many unique forms of sensitive data appear), and/or a number of instances of all sensitive data (i.e., how many total sensitive data elements appear). In this respect, the client station 14 may continuously calculate the one or more indications of the quantity of sensitive data as additional sensitive data elements are identified and data is collected therefor.

As yet another example, during the analysis process, the scanner may cause the client station 14 to determine additional information about the identified sensitive data. For example, the scanner may cause the client station 14 to determine a sensitivity level (e.g., high, medium, low) of each identified sensitive data element, instance, and/or file. As another example, the scanner may cause the client station 14 to determine a potential cause and/or source of each identified sensitive data element, instance, and/or file. As yet another example, the scanner may cause the client station 14 to generate a recommendation for avoiding future storage of each identified sensitive data element, instance, and/or file (or sensitive data similar to that identified sensitive data). Other examples are possible As still another example, during the analysis process, the scanner may cause the client station 14 to perform statistical analysis on the collected data. In this respect, the client station 14 may compare the currently collected data to previously collected data based on the sensitive data indentified on the client station 14, and may then determine changes in the quantity and/or character of stored sensitive data over time. The client station 14 may perform other statistical analysis as well.

Although the scanner may cause the client station 14 to perform the above analysis of the collected data, in a preferred example, the analysis will be carried out primarily by the sensitive data server 12 (as described in more detail below). In this respect, carrying out analysis at the sensitive data server 12 may decrease the size, complexity, transfer time, installation time, and/or update frequency of the scanner, while at the same time allowing an owner or operator of the sensitive data server 12 to maintain and frequently update its analysis techniques.

While collecting data based on the indentified sensitive data during a scan, the scanner may also cause the client station 14 to provide feedback to the user about the current execution of the scanner. In this respect, as one example, the feedback may include data about the progress of the execution of the scanner, such as a start time of the scan, a current run time of the scan, and/or an indication of the data files that have and have not been scanned for instance. As another example, the feedback may include data about the scanner itself, such as a version of the scanner. Other examples are possible as well.

As a result of identifying sensitive data stored in data storage (and collecting data thereon), the scanner may also cause the client station 14 to carry out preventive measures based on the identified sensitive data. For example, the scanner may cause the client station 14 to modify the identified sensitive data stored in the data storage. In this respect, the scanner may cause the client station 14 to delete each identified sensitive data element from the data storage, such that data storage will no longer contain the sensitive data. Additionally or alternatively, the scanner may cause the client station 14 to modify each identified sensitive data element in the data storage, such that any remaining sensitive data elements in the data storage are unreadable. As another example, the scanner may cause the client station 14 to modify its software programs (e.g., application software or operating system software) to avoid future storage of sensitive data.

At step 30, after collecting the data based on the identified sensitive data (and optionally performing other operations as described above), the scanner may cause the client station 14 to report the collected data, preferably to the sensitive data server 12. In this respect, the scanner will preferably cause the client station 14 to send the collected data (or a portion thereof) to the sensitive data server 12 via the network 16 in either encrypted or unencrypted form. In a preferred example, the collected data sent to the sensitive data server 12 will preferably include at least a location in the data storage of the identified sensitive data elements and modified versions of the sensitive data elements, such that unmodified versions of the sensitive data elements are not being sent over the network 16 or replicated on the sensitive data server 12. As another example, the collected data may additionally include metadata elements and/or file signatures for the data files containing the identified sensitive data elements.

In one example, the client station 14 may report the collected data after the client station 14 has completed scanning all desired data during the given execution of the scanner. As another example, the client station 14 may report the collected data for certain previously scanned data while the client station 14 continues scanning other desired data. More particularly, the client station 14 may report the collected data for a given group of previously scanned data files while the client station 14 continues to scan (and collect data for) data files that have not previously been scanned. This interim reporting of collected data by the client station 14 may occur one or more times during the scanning of the data in the data storage. For example, during a given execution of the scanner, the client station 14 may report the collected data in response to a variety of triggering events, such as a determination that that the client station 14 has scanned a predefined number of data files, a determination that the client station 14 has identified a predefined quantity of sensitive data elements, and/or a determination that the client station 14 has been scanning data for a predetermined period of time. In response to sending interim collected data to the sensitive data server, the client station 14 may also receive interim instructions from the sensitive data server 12.

After reporting the collected data, the scanner may also cause the client station 14 to remove some or all of the reported collected data from data storage. For example, after the client station 14 has reported all the collected data for a given execution of the scanner to the sensitive data server 12, the scanner may cause the client station 14 to delete all the collected data from data storage. As another example, after the client station 14 has reported a portion of the collected data to the sensitive data server 12 during ongoing execution of the scanner, the scanner may cause the client station 14 to delete that portion of the collected data. Other examples are possible as well.

Once the client station 14 has finished performing all operations specified by the scanner, the scanner may terminate on the client station 14. In turn, the client station 14 may clear the scanner from volatile data storage. As described above, if the scanner is an application software program stored in non-volatile data storage, the client station 14 may then invoke the scanner again at a later time.

At step 32, the sensitive data server 12 may receive the collected data (or a portion thereof) from the client station 14. In this respect, as described above, the sensitive data server 12 may receive the collected data all at once after the client station 14 completes a given execution of the scanner or in portions during ongoing execution of the scanner. In response to receiving the collected data, the sensitive data server 12 may store the data in the sensitive data server's data storage. In this respect, the sensitive data server 12 will preferably store the data with a corresponding identifier of the originating client station 14 (e.g., an IP address or host name). Further, prior to storing the collected data, the sensitive data server 12 may format the collected data.

At step 34, after receiving the collected data based on the identified sensitive data, the sensitive data server 12 may analyze the collected data for various purposes. As described above, it is preferred that the sensitive data server 12 perform the analysis as opposed to the client station 14.

In one example, during the analysis process, the sensitive data server 12 may use the collected data to validate the identified sensitive data. By carrying out this validation process, the sensitive data server 12 may be able to identify false positives resulting from the sensitive data scan on the client station 14. In a preferred example, the sensitive data server 12 will validate the identified sensitive data resulting from the sensitive data scan on the client station 14 by comparing the collected data based on the identified sensitive data to predefined data that indicates false positives for sensitive data. The sensitive data server 12 will preferably maintain this predefined data in data storage that is either integrated with and/or accessible by the sensitive data server 12. Further, the sensitive data server 12 may update the maintained predefined data as additional information regarding false positives for sensitive data becomes available. These updates may occur periodically or in response to some triggering event. Further yet, the updates may be based on data that the sensitive data server 12 receives via other system entities (e.g., a financial institution's servers) and/or based on user input (e.g., input from an operator or owner of the sensitive data server 12).

In one respect, the predefined data may include one or more false positive data elements, which are data elements that often result in false positives (e.g., sequences of numbers that are often confused for PANs). In this respect, if the collected data includes a version of a sensitive data element identified on the client station 14, the sensitive data server 12 may compare the version of the sensitive data element to each maintained false positive data element to determine whether the identified sensitive data element is a false positive. In another respect, the predefined data may include one or more false positive metadata elements and/or file signatures, which are metadata elements and/or file signatures of data files that often contain false positives. The false positive metadata elements may include identifiers of the data files, locations of the data files, and/or types of the data files. In this respect, if the collected data includes metadata and/or file signatures of data files that the client station 14 identified as containing sensitive data, the sensitive data server 12 may compare the metadata and/or file signature of the identified data files to each maintained false positive metadata element and/or file signature, to determine whether the identified data file contains sensitive data elements that are false positives. Other examples for validating the indentified sensitive data may exist as well. In any case, once the sensitive data server 12 identifies a false positive, the sensitive data server 12 may then flag and/or remove the collected data associated with the false positive.

In another example, during the analysis process, the sensitive data server 12 may use the collected data to calculate one or more indications of the quantity of sensitive data identified on the client station 14, including the quantity of sensitive data elements identified in each given data file and/or the data storage as a whole. For example, the sensitive data server 12 may calculate a number of instances of the same sensitive data (i.e., how many times a particular sensitive data element appears), a number of instances of different sensitive data (i.e., how many unique forms of sensitive data appear), and/or a number of instances of all sensitive data (i.e., how many total sensitive data elements appear).

In yet another example, during the analysis process, the sensitive data server 12 may use the collected data to determine and/or generate additional information about the sensitive data. For example, the sensitive data server 12 may determine a sensitivity level (e.g., high, medium, low) of each identified sensitive data element, instance, and/or file. As another example, the sensitive data server 12 may determine a potential cause and/or source of each identified sensitive data element, instance, and/or file. As yet another example, the sensitive data server 12 may generate a recommendation for avoiding future storage of each identified sensitive data element, instance, and/or file (or sensitive data similar to that identified sensitive data). Other examples are possible In still another example, during the analysis process, the sensitive data server 12 may perform statistical analysis on the collected data, such as trending and/or statistical analysis. For example, the sensitive data server 12 may compare the currently collected data for the client station 14 to previously collected data for the client station 14, and may then determine changes in the quantity and/or character of stored sensitive data over time. As another example, the sensitive data server 12 may compare the currently collected data for the client station 14 to collected data for some other client station, and may then determine differences in the quantity and/or character of stored sensitive data between the two client stations. As yet another example, the sensitive data server 12 may compare the collected data to predefined standards, so as to determine whether the client station 14 is in compliance with those standards. Other examples are possible as well.

In a further example, during the analysis process, the sensitive data server 12 may use the collected data to learn new information about sensitive data and the prevention thereof. For example, based on the collected data, the sensitive data server 12 may identity metadata elements and/or file signatures of data files that typically contain sensitive data and/or false positives. As a result, the sensitive data server 12 (and/or an owner/operator thereof) may update the scanner and/or the predefined data to reflect this new information. Further, the sensitive data server 12 may provide this information to other interested parties, such as regulatory agencies. Other examples are possible as well.

At step 36, after receiving the collected data, the sensitive data server 12 may also provide feedback about the sensitive data identified on the client station 14 to one or more interested parties. As one example, the sensitive data server 12 may provide feedback about the sensitive data on the client station 14 to a user of the client station 14. In this respect, the sensitive data server 12 will preferably provide the feedback to the user of the client station 14 via the interface described above. Further, the feedback may include, for example, metadata of the data files containing the identified sensitive data (e.g., identifiers of the data files, locations of the data files within data storage, etc.), information about each identified sensitive data element (e.g., location of the sensitive data element, type of the sensitive data element, etc.), and/or results of the sensitive data server's analysis of the collected data and the identified sensitive data, such as a sensitivity level of each identified sensitive data element, a projected cause or source of each identified sensitive data element, a recommendation for future avoidance of storing each sensitive data element, and/or one or more indications of the quantity of sensitive data elements on the client station 14. As a result of this feedback, the user of the client station 14 may act to remove the sensitive data from the client station 14 and/or avoid future storage of sensitive information.

As another example, the sensitive data server 12 may provide feedback about the sensitive data on the client station 14 to interested third parties, such as financial institutions, regulatory bodies, and/or statistics companies for instance. In this respect, the sensitive data server 12 may provide the feedback to the third-parties by sending it to a third-party server via the network 16 (e.g., in the form of a secure web page or email). Similar to above, the feedback may include, for example, metadata of the data files containing the identified sensitive data (e.g., identifiers of the data files, locations of the data files within data storage, etc.), information about each identified sensitive data element (e.g., location of the sensitive data element, type of the sensitive data element, etc.), and/or results of the sensitive data server's analysis of the collected data and the identified sensitive data, such as a sensitivity level of each identified sensitive data element, a projected cause or source of each identified sensitive data element, a recommendation for future avoidance of storing each sensitive data element, and/or one or more indications of the quantity of sensitive data elements on the client station 14. As a result of receiving the feedback, an interested third-party, such as a financial institution, may identify client stations 14 that store an undesirable amount of sensitive data and then react accordingly.

While the scanner is executing on the client station 14, the sensitive data server 12 may also send directives to the client station 14 that cause the client station 14 to carry out various functions. For example, as described above, the sensitive data server 12 may send the client station 14 additional instructions and data for carrying out optional functions. As another example, the sensitive data server 12 may send the client station 14 a directive to start, pause and/or stop execution of the scanner on the client station 14. Other examples are possible as well.

If the scanner on the client station 14 is an application software program, the sensitive data server 12 may also provide the client station 14 with updates for the scanner. In a preferred example, the sensitive data server 12 will send the scanner updates to the client station 14 via the network 16. Similar to the scanner, the updates will preferably be a software program, and as such may take the form a binary file that contains object code, machine language code, bytecode, and/or source code for instance. The sensitive data server 12 may provide the client station 14 with the updates periodically or in response to some triggering event, such as a request from the user of the client station 14 or a new update for the installed scanner becoming available. Further, the updates to the installed scanner will preferably be improvements to the functionality of the installed scanner, such as improvements to the scanning algorithm of the installed scanner.

It should be understood that the sensitive data server 12 may perform the above functions for a plurality of client stations 14 at any given time. In this respect, the sensitive data server 12 may act as a centralized entity that may uniformly assess the compliance of various client stations 14 with regulations for sensitive information storage.

Although the method of FIG. 2 is described above as though carried out by the sensitive data server 12 and a single client station 14, it should be understood that other system devices may carry out some or all of the functions described therein. For example, one device may carry out all of the functions described above (i.e., the client station 14 and sensitive data server 12 may reside on the same machine). As another example, if a given client station 14 of FIG. 1 is further connected to other client stations in a LAN (not shown) that do not have connectivity to the sensitive data server 12 via the network 16, the given client station 14 may carry out some or all of the functions described in FIG. 2, and may interact with the sensitive data server 12 on behalf of the other client stations. In this respect, the given client station 14 may act as a passive proxy between the other client stations and the sensitive data server 12.

Advantageously, the present invention may provide an ability to scan data storage for sensitive data according to a user request or a specified schedule and then report the results of the scan to an interested third-party. Further, the present invention may provide an ability to modify and/or remove undesirable sensitive data from the data storage, or avoid future collection of undesirable sensitive data, thus allowing users to increase security and compliance with regulations.

Further yet, by implementing pattern recognition at the client station 14 to identify the sensitive data and verification at the sensitive data server 12 to validate the results of the pattern recognition, the present invention may decrease the size, complexity, transfer time, installation time, and/or update frequency of the scanner, while at the same time enabling the client station 14 to identify a wider range of sensitive data and allowing an owner or operator of the sensitive data server 12 to maintain and frequently update its verification process. Other advantages may exist as well.

Exemplary embodiments of the present invention have been described above. Those skilled in the art will understand, however, that changes and modifications may be made to the embodiments described without departing from the true scope and spirit of the present invention, which is defined by the claims.

We claim:

1. A method of scanning a client for sensitive personal data, wherein the client comprises a processor, data storage, and data stored in the data storage, the method comprising:
    a server receiving, from the client, a request to scan the data stored in the data storage of the client for sensitive personal data, wherein the sensitive personal data comprises one or both of personal financial data and personal identification data;
    in response to receiving the request, the server providing the client with a scanner, wherein the scanner causes the client to carry out functions including:
        scanning at least a portion of the data stored in data storage to identify sensitive personal data by searching for any sequence of characters having a recognizable pattern indicating that the sequence of characters comprises one or both of personal financial data and personal identification data;
        collecting data based on at least a portion of the identified sensitive personal data; and
        reporting the collected data from the client to the server;
    the server receiving the collected data from the client; and
    the server using the collected data to (1) validate the identified sensitive personal data by comparing at least a portion of the collected data to data indicating false positives for sensitive personal data and (2) generate feedback about the identified sensitive personal data.

2. The method of claim 1, wherein the scanner comprises program instructions executable by the processor of the client.

3. The method of claim 1, where providing the client with the scanner comprises sending the scanner to the client via a network.

4. The method of claim 1, further comprising:
    sending to the client an instruction to invoke the scanner, wherein the client invokes the scanner in response to receiving the instruction.

5. The method of claim 1, wherein the personal financial data comprises one or more of Primary Account Number (PAN) data, magnetic stripe data, verification data, and bank account data.

6. The method of claim 1, wherein the function of reporting the collected data comprises sending the collected data from the client to a server via a network.

7. The method of claim 1, wherein the collected data comprises a modified version of the identified sensitive personal data.

8. The method of claim 1, wherein the collected data comprises an indication of a location in the data storage of the identified sensitive personal data.

9. The method of claim 1, wherein the data stored in data storage comprises one or more data files containing the identified sensitive personal data, and wherein the collected data comprises one or both of metadata and a file signature for the one or more data files containing the identified sensitive personal data.

10. The method of claim 1, wherein the scanner further causes the client to carry out a function of modifying the identified sensitive personal data.

11. The method of claim 1, wherein the data indicating false positives for sensitive personal data comprises one or more of data elements, recognizable patterns, metadata, and file signatures.

12. The method of claim 1, further comprising:
    providing the feedback about the identified sensitive personal data to one or both of the client and an interested third party.

13. The method of claim 1, wherein the feedback about the identified sensitive personal data comprises an indication of a location in the data storage of the identified sensitive data.

14. The method of claim 1, wherein providing the client with a scanner comprises providing a user of the client with an interface for interacting with the scanner.

15. A method of scanning a client for sensitive personal data, wherein the client comprises a processor, data storage, and data stored in the data storage, the method comprising:
    a client requesting, from a server, a scan for sensitive personal data stored in the data storage of the client, wherein the sensitive personal data comprises one or both of personal financial data and personal identification data;
    the client receiving a scanner from the server;
    the client invoking the scanner, wherein the scanner causes functions to be carried out including:
        scanning at least a portion of the data stored in data storage of the client to identify sensitive personal data by conducting a search for any sequence of characters having a recognizable pattern indicating that the sequence of characters comprises one or both of personal financial data and personal identification data, wherein (a) the search is configured to not identify any sequence of characters having a recognizable pattern indicating a false positive for sensitive personal data or (b) the scanning involves removing, from the sensitive personal data identified during the search, any sequence of characters that matches data indicating a false positive for sensitive personal data;
        collecting data based on at least a portion of the identified sensitive personal data; and
        reporting the collected data from the client to the server; and
    the client receiving, from the server, feedback about the identified sensitive personal data stored in the data storage of the client.

16. The method of claim 15, further comprising:
    in response to receiving the scanner, the client storing the scanner in the data storage of the client.

17. The method of claim 16, wherein storing the scanner in the data storage of the client comprises temporarily storing the scanner into volatile data storage, and wherein invoking the scanner comprises executing the scanner stored in the volatile data storage via the processor.

18. The method of claim 15, wherein storing the scanner in the data storage of the client comprises storing the scanner into non-volatile data storage of the client, and wherein invoking the scanner comprises:

loading the scanner into volatile data storage of the client; and executing the loaded scanner via the processor of the client.

19. The method of claim 15, wherein the feedback about the identified sensitive personal data comprises one or both of an indication of location of the identified sensitive personal data in the data storage of the client.

20. A method of scanning a client for sensitive personal data, wherein the client comprises a processor, data storage, and data stored in the data storage, the method comprising:

receiving a request to scan the data stored in the data storage of the client for sensitive personal data, wherein the sensitive personal data comprises one or both of personal financial data and personal identification data;

in response to receiving the request, scanning at least a portion of the data stored in the data storage of the client to identify sensitive personal data by searching for any sequence of characters having a recognizable pattern indicating that the sequence of characters comprises one or both of personal financial data and personal identification data;

collecting data based on at least a portion of the identified sensitive personal data;

using the collected data to (1) validate the identified sensitive personal data by comparing at least a portion of the collected data to data indicating false positives for sensitive personal data and (2) generate feedback about the identified sensitive personal data; and providing the feedback about the identified sensitive personal data to a user of the client.

21. The method of claim 15, wherein the data indicating false positives for sensitive personal data comprises one or more of data elements, recognizable patterns, metadata, and file signatures.

22. The method of claim 20, wherein the data indicating false positives for sensitive personal data comprises one or more of data elements, recognizable patterns, metadata, and file signatures.

* * * * *